(12) United States Patent
Miller et al.

(10) Patent No.: US 9,149,108 B2
(45) Date of Patent: Oct. 6, 2015

(54) SYSTEM AND METHOD FOR BATCH SIZING HAIR DYE MIXTURES

(75) Inventors: Debbie Miller, Farmington Hills, MI (US); Mitchell H. Saranow, Winnetka, IL (US); Michael Wright, Lisle, IL (US)

(73) Assignee: SureTint Technologies, LLC, Mount Prospect, IL (US)

( * ) Notice: Subject to any disclaimer, the term of this patent is extended or adjusted under 35 U.S.C. 154(b) by 1124 days.

(21) Appl. No.: 13/081,147

(22) Filed: Apr. 6, 2011

(65) Prior Publication Data

US 2012/0221613 A1 Aug. 30, 2012

Related U.S. Application Data

(60) Provisional application No. 61/446,123, filed on Feb. 24, 2011.

(51) Int. Cl.
*B65B 1/04* (2006.01)
*A45D 44/00* (2006.01)

(52) U.S. Cl.
CPC .................................. *A45D 44/005* (2013.01)

(58) Field of Classification Search
USPC ......... 141/18, 94, 95, 100, 104, 105, 198, 83; 222/58, 132, 145.1
See application file for complete search history.

(56) References Cited

U.S. PATENT DOCUMENTS

| | | | |
|---|---|---|---|
| 4,469,146 A * | 9/1984 | Campbell et al. | 141/9 |
| 4,656,600 A * | 4/1987 | Swann | 702/173 |
| 5,163,010 A | 11/1992 | Klein et al. | |
| 5,493,840 A * | 2/1996 | Cane | 53/50 |
| 6,490,492 B1 | 12/2002 | Fertig et al. | |
| 2003/0065450 A1* | 4/2003 | Leprince | 702/19 |
| 2005/0264794 A1* | 12/2005 | Inzinna et al. | 356/45 |
| 2006/0033907 A1* | 2/2006 | Inzinna | 356/45 |
| 2006/0181707 A1 | 8/2006 | Gibson et al. | |
| 2010/0318220 A1 | 12/2010 | Saranow et al. | |

* cited by examiner

*Primary Examiner* — Jason K Niesz
(74) *Attorney, Agent, or Firm* — Steptoe & Johnson LLP

(57) ABSTRACT

In various embodiments, there is provided a different methods of right sizing. The method would provide for the stylist having a matrix chart outlining as a percentage of or total amount of ingredients needed to create a mixture based on customer characteristics and/or service requested. The stylist would then be capable of creating a more accurate batch based on the matrix outline. The right-sizing of the mixture formula can be done by the stylist themselves or automatically done by a computer-driven system.

20 Claims, 4 Drawing Sheets

Determine Type of Application - *Where will you place color?*

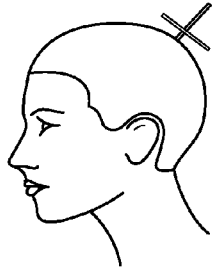 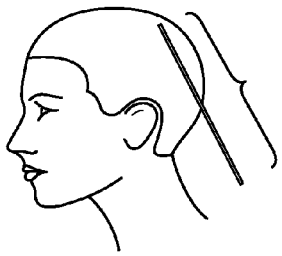 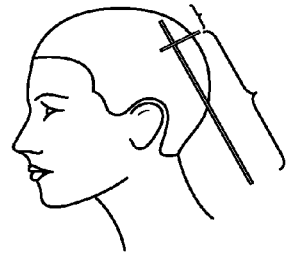

Retouch            Scalp to Ends        Retouch & Refresh
Figure 2aa       Figure 2ab        Figure 2ac

Figure 2a

Determine Length - *How much hair are you working with?*

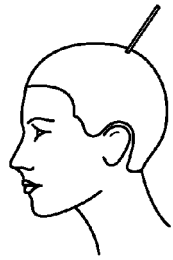 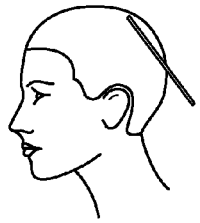 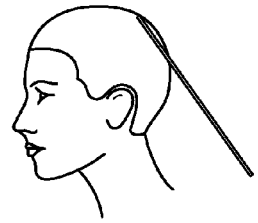

Short 3 inches or less    Medium 3-6 inches    Long 6-8 inches*
Figure 2ba           Figure 2bb        Figure 2bc

Figure 2b

Determine Texture - *What is the characteristic of the hair?*

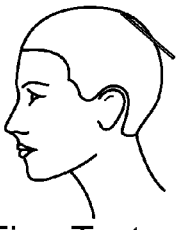 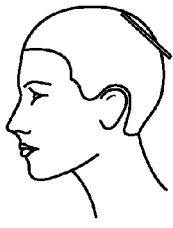 

Fine Texture                               Coarse Texture
              Medium (Normal) Texture
Figure 2ca          Figure 2cb         Figure 2cc

Figure 2c

| | Short Length 1/2"-3" ~302 | Medium Length 3"-6" ~304 | Long Length 6"-8" ~306 |
|---|---|---|---|
| Retouch (up to 1/2") For more than 1/2" regrowth add 7.5 Grams or 1/4 Ounce ~352 | 362<br/>37.5 Grams/1 1/4 OZ | 364<br/>37.5 Grams/1 1/4 OZ | 366<br/>45 Grams/1 1/2 OZ |
| Scalp to Ends ~354 | 372<br/>52.5 Grams/1 3/4 OZ | 374<br/>60 Grams/2 OZ | 376<br/>75 Grams/2 1/2 OZ |
| Retouch & Refresh ~356 | 382<br/>Retouch Batch Size-37.5 Grams/1 1/4 OZ<br/>Refresh Batch Size-45 Grams/1 1/2 OZ | 384<br/>Retouch Batch Size-37.5 Grams/1 1/4 OZ<br/>Refresh Batch Size-52.5 Grams/1 3/4 OZ | 386<br/>Retouch Batch Size-45 Grams/1 1/2 OZ<br/>Refresh Batch Size-60 Grams/2 OZ |

Figure 3

| | Short Length 402 | Medium Length 404 | Long Length 406 |
|---|---|---|---|
| Zone refers to no more than 20% of head — 452 |  462 15 Grams/½ OZ |  464 22.5 Grams/¾ OZ |  466 30 Grams/1 OZ |
| Partial refers to no more than 40% of the head — 454 | 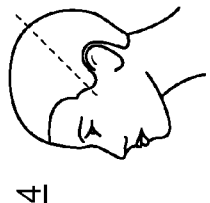 472 30 Grams/1 OZ |  474 37.5 Grams/1¼ OZ |  476 45 Grams/1½ OZ |
| Full refers to 50% and beyond — 456 |  482 60 Grams/2 OZ |  484 75 Grams/2½ OZ |  486 90 Grams/3 OZ |
Figure 4

SYSTEM AND METHOD FOR BATCH SIZING HAIR DYE MIXTURES

CROSS REFERENCE TO RELATED APPLICATIONS

This application claims priority to U.S. Provisional 61/446,123 filed Feb. 24, 2011.

FIELD OF THE INVENTION

The present invention relates to a system and method for determining the proper batch sizing for hair dye mixtures.

BACKGROUND OF THE INVENTION

The present invention can be used in various fields and various applications. In one such field, namely, cosmetics and hair dye preparations, hair dye mixtures or compositions are typically created by a stylist based on a formula that was either created initially by a dye manufacturer or custom created by a stylist. The stylist must estimate how much on average of a mixture to mix and in most circumstances will over estimate in order to avoid having to take the time to make more of the mixture during the application process. This obviously leads to wasted materials and extra expense for the salon. To help reduce the waste it is desired to create a batch sizing system and method that will permit a stylist to determine the most efficient batch size quickly and easily.

SUMMARY OF THE INVENTION

In but one embodiment of the invention, a system for batch sizing hair dye mixture can include a computer driven blending system. The computer driven blending system can be a developed on a laptop, desktop, and/or hand-held/portable device. The computer driven system would may include an input device such as a touch screen, keyboard, mouse, or other computer input device used in conjunction with a screen. The computer driven blending system would store in a memory at least one mixture formulated from the mixing of one or more components, such as but not limited to hair dye mixtures, personal care products mixtures, etc. The components may include, but are not limited to, colorants, dyes, and/or blending materials. Once the stylist selects the mixture, the stylist then selects the customer characteristics and/or service requested. Based on the selection, the computer driven system right-sizes the formula or batch and then displays to the stylist the corrected formula.

In another embodiment, there is provided a method of right sizing. The method would provide for the stylist having a chart outlining as a percentage of or total amount of ingredients needed to create a mixture based on customer characteristics and/or service requested. The stylist would then be capable of creating a more accurate batch based on the chart outline.

BRIEF DESCRIPTION OF THE DRAWINGS

A fuller understanding of the foregoing may be had by reference to the accompanying drawings, wherein:

FIG. 2A-2C are graphic representations of various batch sizing criteria;

FIG. 3 is a matrix showing the length of hair against the amount to be applied; and FIG. 4 is a matrix showing the length of hair against the type of single application process.

DETAILED DESCRIPTION OF THE EMBODIMENTS

Figure 1A:
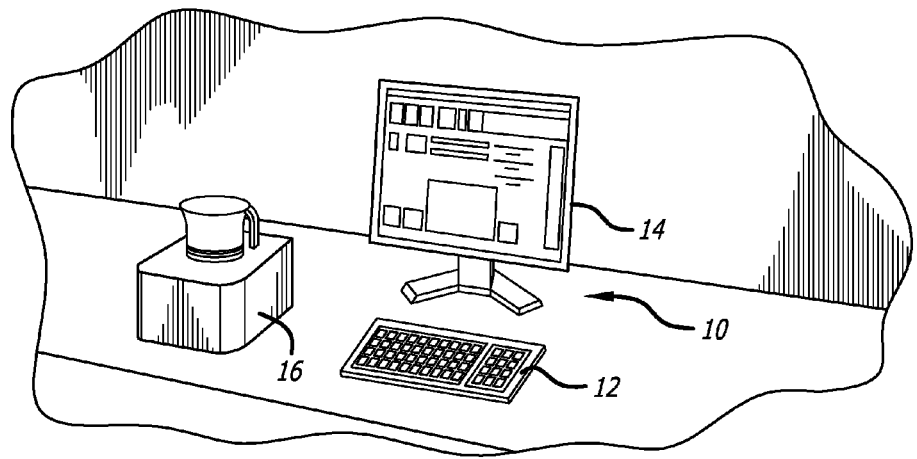
FIG. 1A is a perspective view of one embodiment of the system designed to right-size a formula batch based on a stylist selecting the hair length and application.
Figure 1B:
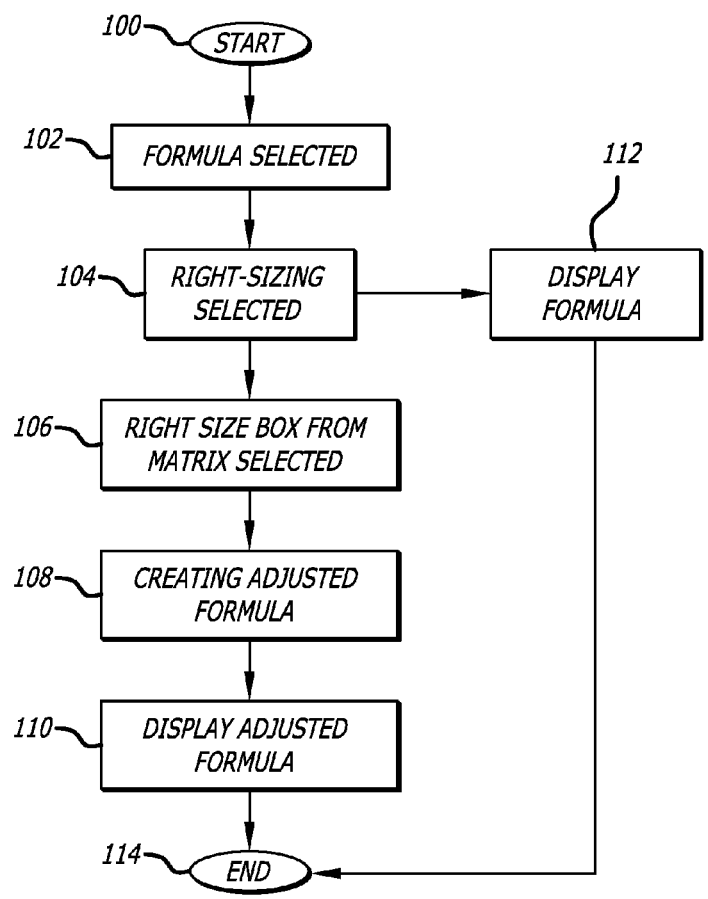
FIG. 1B is an outline of a method of performing an embodiment of the invention.

While the invention is susceptible to embodiments in many different forms, there are shown in the drawings and will described herein, in detail, the preferred embodiments of the present invention. It should be understood, however, that the present disclosure is to be considered an exemplification of the principles of the invention and is not intended to limit the spirit or scope of the invention and/or embodiments illustrated.

In a first embodiment of the invention illustrated in FIG. 1A, there is shown a system 10 for preparation of mixture, such as but not limited to hair dye mixtures, personal care product mixtures, etc. The system includes a computer control system having at least a memory, input controls 12, and a display 14.

The system can be any computer based system readily available for use and incorporation, including but not limited to touch screen tablets, laptops, mobile devices, and/or pc hard drives with separate monitors and input devices (keyboards, mouse, etc.). The system further includes the capacity to run various software programs, algorithms, and coded lines to accomplish the tasks that are outlined herein. These software related tasks may either be separable and linked together to exchange/communicate information and date; or be combined into a single program.

The memory has the capacity to store and/or storing at least one mixture formulated from the mixing of one or more components, such as but not limited to colorants, dyes, and/or blending materials.

The system upon receiving an input for a creation of a mixture includes software for displaying the formula of the mixture on the display to indicate the component(s) and amount(s) needed to create the desired mixture.

The system further includes software for batch sizing the mixture based on inputs received from the stylist. The batch sizing software automatically creates an adjusted formula that is displayed to the stylist for their manual re-creation of the mixture. Inputs could be from a touch screen, mouse, keyboard, voice recognition software, etc. The batch sizing software is capable of adjusting the formula to create an adjusted formula and then is further capable of displaying the adjusted formula for the stylist's use.

Referring now to FIG. 2B, to automatically determine the correct batch or formula size, the system will request an input(s) from the stylist. The stylist will first select a formula of a mixture, 102. The stylist will then request to have the formula right-sized 104. Electronically, this could be done by the using selecting either in a touch screen, mouse click, or highlighted entry. The system will then produce a matrix, or other configuration, on the screen, which requires the stylist to select one of the boxes. 106. Once one of the boxes is selected, the batch sizing software is capable of batch-sizing the formula 108 to match the selected entry. The adjusted or batch-sized formula is then displayed for the stylist 110. If batch sizing is not requested, the formula can simply be displayed, 112. After which the batch sizing software will end, 114.

In other aspects, the right sizing system software once selected is capable of displaying a series of questions prior to the display of the matrix or other configuration. The questions may further include graphical images that help the stylist to formulate a response. Referring now to FIGS. 2a-2c, there is shown a series of questions and graphical images that may be included with the questions. Based on the answer to these questions, the batch sizing software is capable of automatically calculating an adjusted formula or if the formula is not present is capable of displaying the proper amount of materials to use, which typically would not include the developer material. It being typical in the industry to use a 1:1, 1:1.5, or 1:2 ratio of materials to developer. Often the manufacturer sets this ratio for its own products. For example purposes, FIG. 2a includes a question on the determination of the type of hair application, such as a Retouch Application (FIG. 2aa); a Scalp to Ends Application (FIG. 2ab), or a Retouch and Refresh Application (FIG. 2ac). A second question may determine the length of the hair, FIG. 2b. With pictorial representations of Short Hair (FIG. 2ba); Medium Hair (FIG. 2bb); and Long Hair (FIG. 2bc). Lastly, the system may need to determine the texture of the hair, such as Fine Hair (FIG. 2ca); Medium or Normal Hair (FIG. 2cb); and Coarse Hair (FIG. 2cc). As noted the individual questions could be presented electronically one at a time to provide the batch sizing software with answers that once receive is capable of automatically creating an adjusted formula for further display to the stylist. The answer to the questions could be through a touch screen with the user selecting the appropriate graphic representation.

Referring now to FIG. 3, there is shown in another embodiment a matrix that can be used by a stylist to determine the amount of colorant to use on a customer. The matrix while shown as a 3×3 matrix could be larger or smaller depending on specific use, customization, or product manufacturer aspects. Following similar process above, the system will request input(s) from the stylist. First, the stylist will select a formula of a mixture. Second, the stylist will request to have the formula right-sized. Third, the system will produce a matrix on the screen, requiring the stylist to select one of the boxes from the matrix. In this exemplary illustration, across the top of the matrix there is a first legend listing hair lengths 300, short length hair 302, medium length hair 304, and long hair 306; while across the side there is a second legend listing the hair care application 350, retouch 352, Scalp to ends 354, and retouch and refresh 356. In a color retouch for a single process color, the application of a batch is applied to the new growth of hair not exceeding ½ inch growth. The color retouch is necessary for covering gray, or in maintaining all over color, such as the maintenance of color services. In a retouch and refresh, the application of batch is applied to the new growth, mid-growth and ends of hair. Often a separate formulation is prepared for mid shaft and ends. All hair from new growth through the ends is covered with color. This service is needed when the overall color has lost its tone, faded more than one level, corrected work is needed or the dent has requested a change of color. Color tends to fade due to sun exposure, swimming or the use of harsh shampoos. It also shown or illustrated that the total amounts in listed by the matrix if for the total amount of colorant or dye and does not include developer. Also, the stylist should keep in mind other key factors such as multi-shades, alternating more than one color and ration of the developer.

As illustrated in FIG. 3, there is shown the following: box 362 a retouch for short length hair, box 364 a retouch for medium length hair, and box 366 a retouch for long length hair; box 372 a scalp to end for short length hair, box 374 a scalp to end for medium length hair, and box 376 a scalp to end for long length hair; and box 382 for a retouch and refresh for short length hair; box 384 for a retouch and refresh for medium length hair; and box 386 for a retouch and refresh for long length hair.

In addition, a subsequent or preceding question regarding the texture of the hair could alter the amounts accordingly. For example, the information calculated or displayed could be for normal texture hair. The batch sizing software, if prepared to take the texture of the hair into account in its adjustment, would be capable of adjusting the formula by decreasing the amount of the formula for fine or thin textured hair and/or increasing the amount of the formula for coarse or dense hair. The increase or decrease may be based on the hair or may simply be adjusted by adding or subtracting ¼ or ½ oz of product to the total amount. This would be automatically done by the batch sizing software that is capable of a textured adjustment.

In another embodiment, a further matrix or other configuration may be used or provided to determine the batch sizing adjustment based on the amount of an off scalp process, illustrated in FIG. 4. Across the top of the matrix there is first legend listing hair lengths 400, short length hair 402, medium length hair 404, and long hair 406; while across the side there is a second legend listing amount to apply 450, such as Zone 452 (20% or less of the head); Partial 454 (no more than 40%); and Full 456 (50% and greater). Once one of the grid squares is selected the software is capable of right-sizing the formula based on the amount to apply. The right-sized or adjusted formula will then be displayed for the stylist in order for the manual re-creation of the right-sized formula.

As illustrated in FIG. 4, there is shown the following: box 462 a zone off scalp application for short length hair, box 464 a zone off scalp application for medium length hair, and box 466 a zone off scalp application for long length hair; box 472 a partial off scalp application for short length hair, box 474 a partial off scalp application for medium length hair, and box 476 a partial off scalp application for long length hair; and box 482 a full off scalp application for short length hair; box 484 a full off scalp application for medium length hair; and box 486 a full off scalp application for long length hair.

In addition, the data input for the boxes or matrix can be based on other customer characteristics or services requested. As such the individual items in the rows and columns exhibited herein, may be changed without deviating from the scope and spirit of the invention. In addition, a larger matrix can be placed that further defines other percentages of application and further defines the types of hair such as fine, medium, coarse, and combinations thereof. Each of these types can be further refined, for example, Coarse hair may include Rough, Wire, Heavy, Wild, Strong.

The system may include further questions for the stylist, including whether the re-growth on long hair exceeds ½ inch, in which case the right-sizing will add 7.5 grams or ¼ ounce of color to the formula.

In a method of right-sizing a batch, the stylist will start with a formula outlining the various colorants and/or blending materials along with the amounts to be added. With being provided a particular matrix that outlines the hair length or hair style against the service requested (refresh, scalp to end, retouch, particular zone, partial, full) the stylist will select the correct matrix grid square corresponding to the customer characteristic and the service required. Based on the selected matrix grid square and the amount dictated therein, the stylist can calculate the correct batch size. This can be done without the aid of a computer-driven system.

According to one of the aspects of the present invention, the matrix being a 3×3 grid for the application off scalp starts with a single zone for short length hair with the required amount of 15 grams of color used to blend.

The present invention includes one or more various embodiments for batch sizing a formula. In a first embodiment of the present invention there is provided a method of batch sizing a formula of one or more hair dye materials, with corresponding recommended amounts. The formula is defined for a stylist to manually recreate a hair dye mixture. This first embodiment is performed by an electronic device that has a display, memory, and an input device. The first embodiment includes, providing an electronic device that has a computer based medium with a computer readable program code executed to perform various functions. These functions include (a) the displaying of a plurality of batch sizing adjustment criteria, wherein each of the batch sizing adjustment criteria defines a total amount for a formula; (b) the receiving of a user input selecting one of the plurality of batch sizing adjustment criteria; (c) the creation of an adjusted formula with adjusted corresponding recommended amounts based on the selected batch sizing adjustment criteria; and (d) the displaying of at least the adjusted corresponding recommended amounts.

In a second embodiment of the present invention there is provided a method of batch sizing a formula, of one or more hair dye materials, with corresponding recommended amounts. The formula is defined for a stylist to manually recreate a hair dye mixture. This second embodiment is performed by providing an electronic device, which has a computer based medium with a computer readable program code being executed to display a plurality of batch sizing adjustment criteria auto-arrange in a matrix of adjustment boxes. Each of the batch sizing adjustment criteria defines a total amount for a formula. The second method is formed by selecting one of the plurality of batch sizing adjustment criteria; and adjusting the formula by adjusting corresponding recommended amounts based on the selected batch sizing adjustment criteria.

In a third embodiment of the present invention there is provided a method of batch sizing a formula, of one or more hair dye materials, with corresponding recommended amounts. The formula is defined for a stylist to manually recreate a hair dye mixture. This third embodiment is performed by providing a plurality of batch sizing adjustment criteria wherein each of the batch sizing adjustment criteria defines a total amount for a formula. The method continues by the selection of one of the plurality of batch sizing adjustment criteria and then adjusting the formula by adjusting corresponding recommended amounts based on the selected batch sizing adjustment criteria.

In a fourth embodiment of the present invention there is provided an apparatus for batch sizing a formula. The apparatus includes a control system having at least a memory, an input control, and a display. The apparatus further includes batch sizing software, being configured to first display a plurality of batch sizing adjustment criteria, wherein each of the batch sizing adjustment criteria defines a total amount for a formula; being configured to receive an input from the input control a selection of one of the plurality of batch sizing adjustment criteria; being configured to create an adjusted formula with adjusted corresponding recommended amounts based on the selected batch sizing adjustment criteria; and being configured to display the adjusted formula and to display the adjusted corresponding recommended amounts.

In a fifth embodiment of the present invention there is provided an apparatus for batch sizing a formula. The apparatus includes a control system having at least a memory, an input control, and a display. The apparatus further includes batch sizing software, being configured to display a plurality of batch sizing adjustment criteria, wherein each of the batch sizing adjustment criteria defines a total amount for a formula. The batch sizing software being further configured to receive an input from the input control a selection of one of the plurality of batch sizing adjustment criteria and configured to create an adjusted formula with adjusted corresponding recommended amounts based on the selected batch sizing adjustment criteria. The batch sizing software is yet further configured to display the adjusted formula and to display the adjusted corresponding recommended amounts.

In one or more of the above embodiments, the control system or electronic device may be defined to reside in one of the following: a hand-held PDA, mobile-phone, laptop computer, and pc computer. The above embodiment may further define the batch sizing adjustment criteria as a series of questions or as a plurality of adjustment boxes arranged in a matrix on the display.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method of batch sizing a formula, the formula defining one or more hair dye materials and corresponding recommended amounts for creating an individual batch sized amount of a hair dye mixture, the method comprising:
   providing a control system having at least a processor, a computer-readable memory, and a display, wherein the memory contains software configured to receive a formula defining instructions for blending a hair dye mixture using one or more colorants and/or dye blending materials and amounts recommended for the hair dye mixture;
   displaying a plurality of batch sizing adjustment criteria, wherein each of the batch sizing adjustment criteria defines a total amount for a formula; and
   receiving a user input selecting one of the plurality of batch sizing adjustment criteria, the batch sizing adjustment criteria including hair characteristics;
   wherein the control system calculates batch sizing information associated with the hair dye mixture when hair characteristic input received by the control system indicates an individual batch sized amount that is different than a standard batch sized amount produced by the formula and displays the calculated batch sizing information associated with the hair dye mixture on the display.

2. The method of claim 1, wherein the batch sizing adjustment criteria includes a plurality of adjustment boxes on the display.

3. The method of claim 2, wherein the adjustment boxes are arranged in an X by Y matrix on the display.

4. The method of claim 1, wherein the control system is incorporated into one of the following: a hand-held PDA, mobile-phone, laptop computer, and pc computer.

5. The method of claim 1, wherein the batch sizing adjustment criteria has at least one question regarding a use of the formula for a customer.

6. The method of claim 1, wherein the batch sizing adjustment criteria has at least one question regarding a type of hair for a customer.

7. The method of claim 1, wherein the batch sizing adjustment criteria has at least one question regarding a length of hair for a customer.

8. A method of batch sizing a formula, the formula defining one or more hair dye materials and corresponding recommended amounts for creating an individual batch sized amount of a hair dye mixture, the method comprising;
   providing a control system having at least a processor, a computer-readable memory, and a display, wherein the memory contains software configured to receive a formula defining instructions for blending a hair dye mixture using one or more colorants and/or dye blending materials and amounts recommended for the hair dye mixture, and configured
   to display a plurality of batch sizing adjustment criteria auto-arrange in a matrix of adjustment boxes, wherein each of the batch sizing adjustment criteria defines an amount for the formula; and
   receiving an input selecting one of the plurality of batch sizing adjustment criteria, the batch sizing adjustment criteria including hair characteristics;
   wherein the control system calculates batch sizing information associated with the hair dye mixture when hair characteristic input received by the control system indicates an individual batch sized amount that is different than a standard batch sized amount produced by the formula and displays the calculated batch sizing information associated with the hair dye mixture on the display.

9. The method of claim 8, wherein the control system is incorporated into one of the following: a hand-held PDA, mobile-phone, laptop computer, and pc computer.

10. An apparatus for batch sizing a formula, the formula defining one or more hair dye materials and corresponding recommended amounts for creating an individual batch sized amount of a hair dye mixture, the apparatus comprising:
   a control system having at least a processor, a computer-readable memory, and a display, wherein the memory contains software configured to receive a formula defining instructions for blending a hair dye mixture using one or more colorants and/or dye blending materials and amounts recommended for the hair dye mixture, the software further including:
   a first component configured to display a plurality of batch sizing adjustment criteria, wherein each of the batch sizing adjustment criteria defines an amount for the formula; and
   a second component configured to receive an input selection of one of the plurality of batch sizing adjustment criteria, the batch sizing adjustment criteria including hair characteristics;
   wherein the control system calculates batch sizing information associated with the hair dye mixture when hair characteristic input received by the control system indicates an individual batch sized amount that is different than a standard batch sized amount produced by the formula and displays the calculated batch sizing information associated with the hair dye mixture on the display.

11. The apparatus of claim 10, wherein the batch sizing adjustment criteria includes a plurality of adjustment boxes arranged in a matrix on the display.

12. The apparatus of claim 10, wherein the control system is defined to reside in one of the following: a hand-held PDA, mobile-phone, laptop computer, and pc computer.

13. An apparatus for batch sizing a formula, the formula defining one or more hair dye materials and corresponding recommended amounts for creating an individual batch sized amount of a hair dye mixture, the apparatus comprising:
   a control system having at least a processor, a computer-readable memory, and a display, wherein the memory contains software configured to receive a formula defining instructions for blending a hair dye mixture using one or more colorants and/or dye blending materials and amounts recommended for the hair dye mixture, and configured
   to display a plurality of batch sizing adjustment criteria, wherein each of the batch sizing adjustment criteria defines an amount for the formula;
   a user input device configured to receive an input of one or more of the plurality of batch sizing adjustment criteria, the batch sizing adjustment criteria including hair characteristics;
   wherein the control system calculates batch sizing information associated with the hair dye mixture when hair characteristic input received by the control system indicates an individual batch sized amount that is different than a standard batch sized amount produced by the formula and displays the calculated batch sizing information associated with the hair dye mixture on the display.

14. The apparatus of claim 13, wherein the batch sizing adjustment criteria includes a series of questions.

15. The apparatus of claim 13, wherein the batch sizing adjustment criteria includes a plurality of adjustment boxes arranged in a matrix on the display.

16. The apparatus of claim 13, wherein the batch sizing adjustment criteria is at least one question regarding a use of the formula for a customer.

17. The apparatus of claim 13, wherein the batch sizing adjustment criteria is at least one question regarding a type of hair for a customer.

18. The apparatus of claim 13, wherein the batch sizing adjustment criteria is at least one question regarding a length of hair for a customer.

19. A method of batch sizing a formula, the formula defining one or more hair dye materials and corresponding recommended amounts for creating an individual batch sized amount of a hair dye mixture, the method comprising:
   providing a control system having at least a processor, a computer-readable memory, and a display, wherein the memory contains software configured to receive a formula defining instructions for blending a hair dye mixture using one or more colorants and/or dye blending materials and amounts recommended for the hair dye mixture;
   providing a plurality of batch sizing adjustment criteria; and
   receiving input selecting one of the plurality of batch sizing adjustment criteria, the batch sizing adjustment criteria including hair characteristics;
   wherein the control system calculates batch sizing information associated with the hair dye mixture when hair characteristic input received by the control system indicates an individual batch sized amount that is different than a standard batch sized amount produced by the formula and displays the calculated batch sizing information associated with the hair dye mixture on the display.

20. The method of claim 19, wherein the batch sizing adjustment criteria includes a plurality of adjustment boxes arranged in a pattern on the display.

\* \* \* \* \*